July 23, 1957 J. H. COOPER 2,800,567
NARROW LAP OR SEMI-MASH TYPE TRAVEL HEAD SEAM WELDER
Filed Aug. 15, 1955 6 Sheets-Sheet 1

INVENTOR
JOSEPH H. COOPER
BY Francis J. Klempay
ATTORNEY

July 23, 1957    J. H. COOPER    2,800,567
NARROW LAP OR SEMI-MASH TYPE TRAVEL HEAD SEAM WELDER
Filed Aug. 15, 1955    6 Sheets-Sheet 4

INVENTOR.
JOSEPH H COOPER
BY *Francis J. Klempay*
ATTORNEY

INVENTOR
JOSEPH H. COOPER

July 23, 1957 J. H. COOPER 2,800,567
NARROW LAP OR SEMI-MASH TYPE TRAVEL HEAD SEAM WELDER
Filed Aug. 15, 1955 6 Sheets-Sheet 6
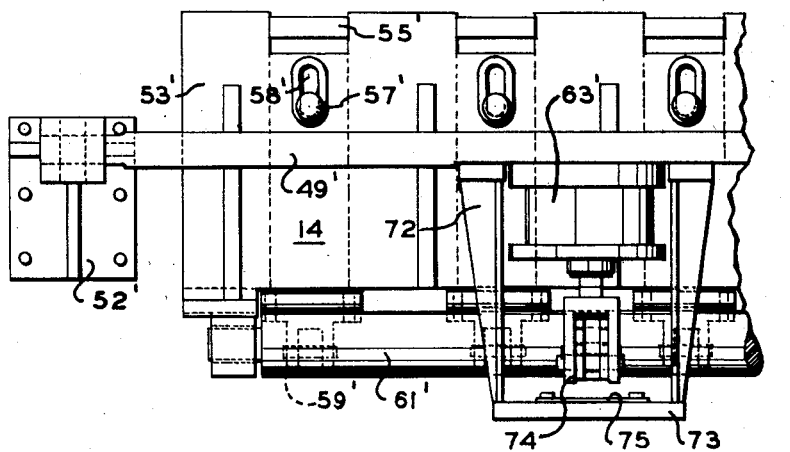
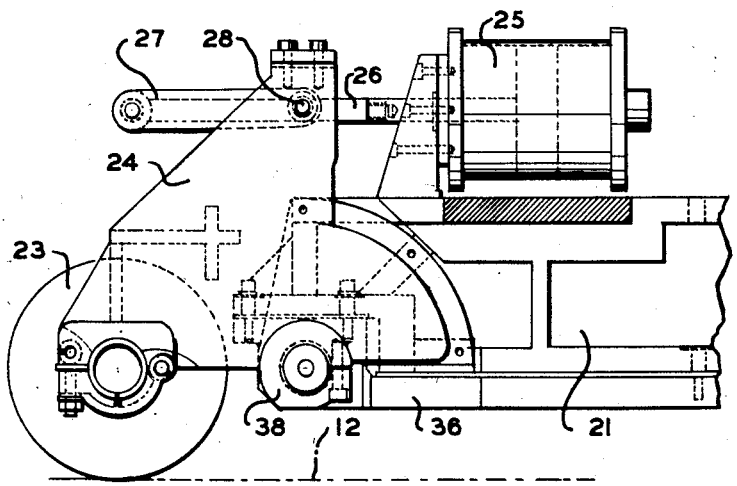
INVENTOR
JOSEPH H. COOPER
BY *Francis J. Klempay*
ATTORNEY United States Patent Office 2,800,567
Patented July 23, 1957

2,800,567

NARROW LAP OR SEMI-MASH TYPE TRAVEL HEAD SEAM WELDER

Joseph H. Cooper, Warren, Ohio, assignor to The Taylor-Winfield Corporation, Warren, Ohio, a corporation of Ohio Application August 15, 1955, Serial No. 528,202

17 Claims. (Cl. 219—82)

The present invention relates in general to the art of electric resistance welding, and more particularly to the joining of metal strip and sheet in end-to-end relation by electric resistance welding methods.

In many metal strip and sheet processing operations, such as galvanizing, tin plating and the like, it is desirable to maintain a continuous movement of strip through the processing line so that periodic threading of a new strip length through the entire line is avoided. Thus it is common to provide at the entry end of the strip line a welder device by means of which the leading end of a new coil or length of strip may be joined with the trailing end of a previous coil or length. In most cases so-called lap seam welders are provided for this purpose, by means of which the leading and trailing ends of successive coils are welded in overlapped relation. However, in many cases it is impractical or otherwise undesirable to permit an overlapped strip section to pass through certain of the line components, such as roller levelers, for example, in which case flash-butt welding equipment is often employed. In the latter case, the ends of successive coils are abutted and fused so that no overlapping of strip thicknesses results.

It will be understood, however, that flash-butt welding equipment is of a complicated and expensive nature, generally, and in the case of very thin strip satisfactory results are often difficult of obtainment. Therefore, it has been heretofore proposed to employ a so-called narrow lap, or semi-mash welder device, in which the ends of successive coils are overlapped just slightly and during the heating and fusing operation are partly deformed and flattened so that the resulting weld, while not necessarily as thin as the original strip, is considerably smaller and thinner than the normal lap weld seam.

The present invention has as its primary or ultimate object the provision of a welding apparatus of the last-named type, that is, of the narrow lap or semi-mash type, which is of a substantially improved nature, as compared to heretofore known apparatus for accomplishing the same general result.

More specifically, it is an object of the present invention to provide an improved narrow lap seam welder in which are provided means for handling and positioning the strip ends in a more effective and expeditious manner than has been possible heretofore. As will be readily understood, it is important in narrow lap seam welding operations that the strip ends to be joined be accurately positioned with respect to each other, in slightly overlapped relation, and held in such position during the welding operation. Therefore, the within object contemplates the provision of novel retractible gage bar means positioned adjacent the line of welding and adjacent rigid strip clamping means whereby the ends of the strip sections may be accurately positioned at the welding station and thereupon firmly clamped and held during the welding operation.

Another specific object of the invention resides in the provision of a novel narrow lap seam welder apparatus having combined clamp and gage bar means on each side of the welding traverse, and closely adjacent thereto, so that each strip end portion may be separately positioned and clamped in a manner insuring the high accuracy which is sought.

Another specific object of the invention resides in the provision in a semi-mash seam welder of the type having fixed clamping means and gauge means acting in conjunction therewith to position and firmly grip successive strip end sections for welding of a novel and simplified arrangement for moving the strip end portions into overlapped relation prior to welding.

Yet another object of the invention is the provision of a semi-mash or narrow lap welding apparatus having the novel and advantageous characteristics above stated which is more compact and generally of a more simplified nature than apparatus heretofore proposed for the same general purpose.

The above and other objects and advantages of the invention will become apparent upon full consideration of the following detailed specification and accompanying drawing wherein is disclosed a certain preferred embodiment of the invention.

In the drawing:

Figure 8 is an enlarged fragmentary view, partly in section, of a welding wheel and support therefor, as incorporated in the apparatus of Figure 1;

Figure 9 is an enlarged fragmentary plan view of the apparatus of Figure 1, illustrating primarily my novel strip positioning means;

Figure 1:
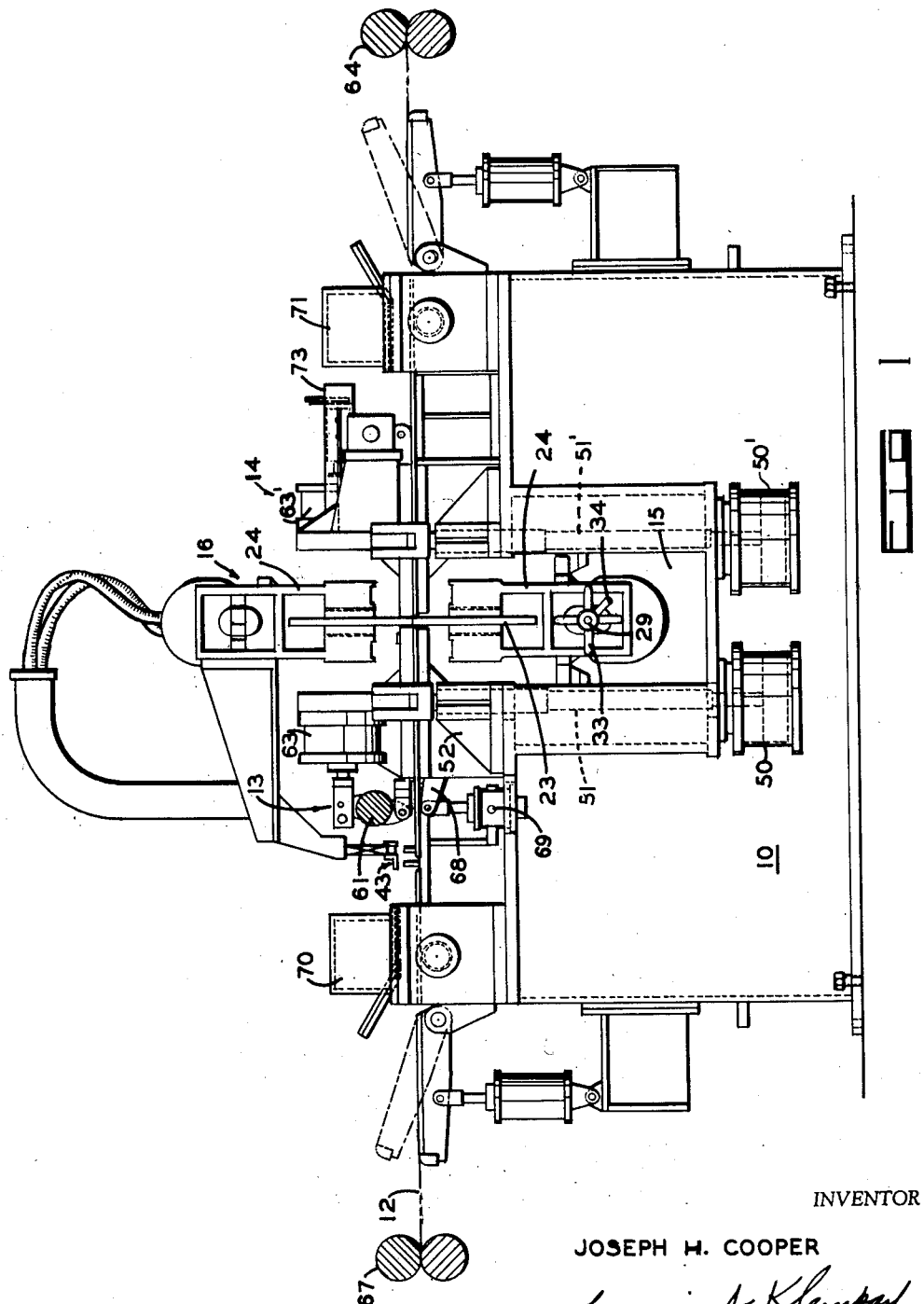
Figure 1 is a side elevation of a semi-mash welding apparatus constructed in accordance with the teachings of my invention.

Figure 10 is an enlarged fragmentary top plan view of the apparatus of Figure 1, taken partly in section, illustrating primarily my improved mechanism for raising one strip section into overlapped relation to the other prior to welding; and Figure 11 is an enlarged fragmentary elevation of the apparatus of Figure 1, taken partly in section, illustrating features of my strip positioning, elevating and clamping mechanisms.

Referring now to the drawings, and initially to Figures 1–3 thereof, the numeral 10 designates a base or foundation structure which is mounted on the plant floor 11 below and in aligned relation a strip pass line 12 of a continuous strip processing line, not shown. At the opposite ends of the base 10 are mounted strip clamping and positioning assemblies 13 and 14, to be further described, which are positioned in embracing relation to the pass line 12 so that strip material is caused to pass therethrough during its movement through the strip line.

Intermediate the ends of the base 10 there is provided a large upwardly opening U-shaped recess 15 in which is movably received a generally transversely disposed and transversely movable welder assembly 16. The base 10 is provided with elongated transversely disposed guiding and supporting tracks 17 and 18 which extend for a substantial distance outwardly of the base proper, and which serve to slidably support the welder 16 in various positions over a traverse of substantial length, as indicated in Figure 3, for example.

The welder assembly 16 is comprised of a base portion 19 which supports at its forward end portion a lower horizontally disposed electrode mounting arm 20. Secured in rigid relation to the lower arm 20 is an upper arm 21 which is disposed in generally parallel relation to the lower arm 20, being spaced above the latter, however, whereby to define a horizontally disposed forwardly opening U-shaped recess 22.

At the forward end extremity of each of the electrode mounting arms 20 and 21 there is mounted an electrode assembly comprising an electrode wheel 23 and a journal bracket 24 therefor which is pivotally secured to its respective mounting arm 20 or 21. On each of the arms 20 and 21 there is mounted an electrode actuating cylinder 25, the piston rod 26 of which extends forwardly through an opening 27 in the journal bracket 24 (see Figures 1 and 8). Connecting with the piston rod 26 on opposite sides thereof, are links 27 which are pivotally connected to the journal bracket 24 at 28. The links 27 form an articulate interconnection between the linearly movable piston rod 26 and the arcuately movable journal bracket 24 so that upon proper actuation of either cylinder 25 the electrode wheel 23 associated therewith is caused to move toward or away from the strip pass line 12.

Figure 3:
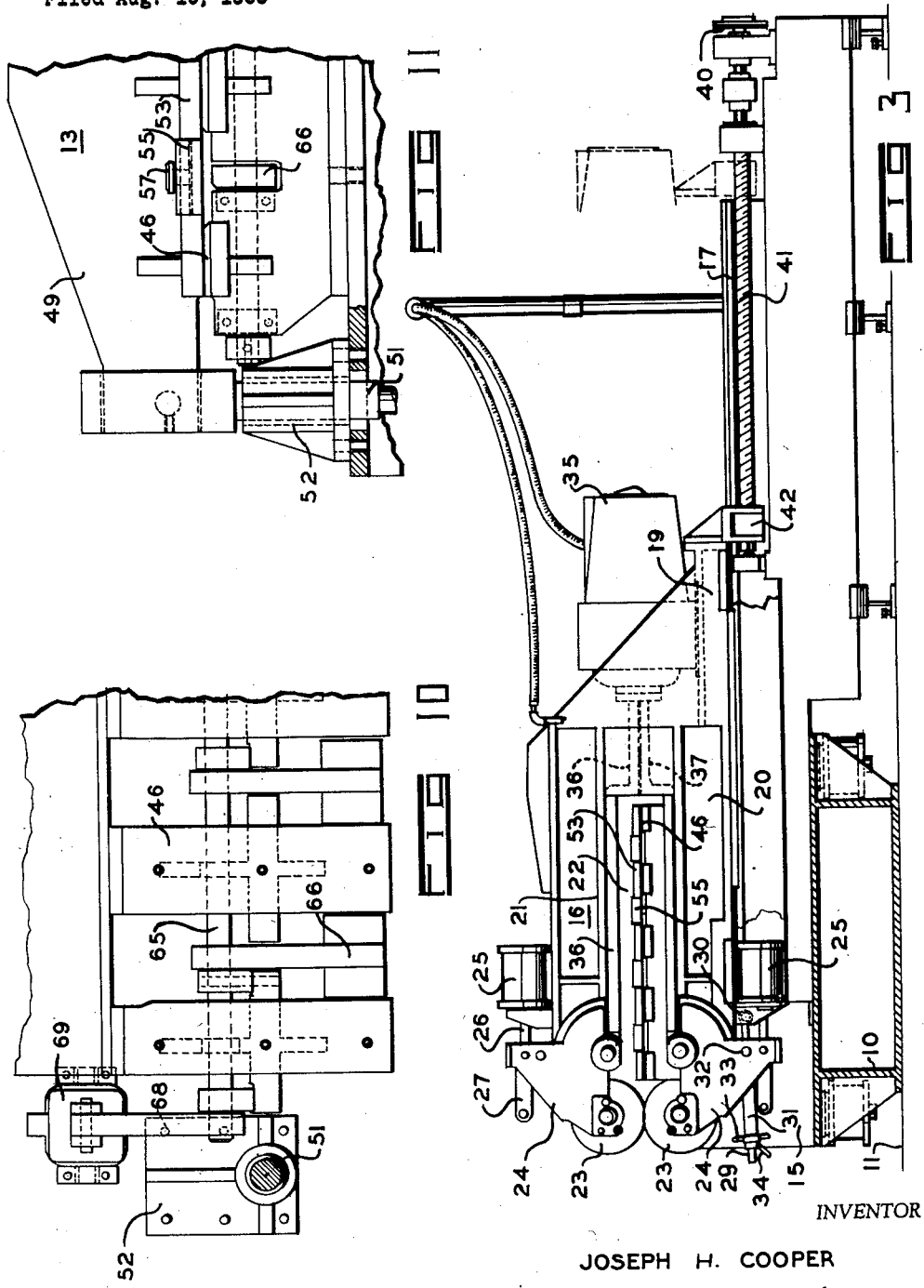
Figure 3 is a section view of the apparatus of Figure 1, taken generally along line III—III of Figure 2.

As will be observed in Figure 3, the lower electrode wheel assembly is provided with a movement limiting device which comprises a threaded rod 29, pivoted at 30 to the lower arm 20 and extending forwardly thereof. Slidably received over the rod 29 is a sleeve 31 which is pivotally connected at its innermost end to the lower bracket 24, by means of trunnion pintles 32. At the outer end of the threaded rod 29 there is received an adjustable hand wheel 33 and locking nut 34 therefor. The wheel 33 forms an abutment surface which is adapted to engage the forward end of the sleeve 31 upon predetermined outward pivoting movement of the lower bracket 24 to rigidly limit such outward pivoting movement. The wheel 33 may be threadedly adjusted to any desired position, after which the nut 34 is brought up to the wheel 33 to lock it in such adjusted position.

Mounted at the inner end of the base portion 19 of the welder assembly is a heavy duty transformer 35. The secondary terminals of the transformer face forwardly and are connected with heavy secondary circuit conductors 36 and 37. These conductors are extended along the inner edges of the electrode mounting arms 22 and 21 and connected at their outer or forward ends to conductive bearing assemblies, as indicated at 38 in Figure 8. The secondary conductors 36 and 37, as well as the conductive bearing assemblies 38 are insulated from the arms 21 and 22 so that the secondary current is confined to the conductors, journal brackets 24 and electrode wheels 23.

In the performance of a welding operation the opposite ends of successive coils or lengths of strip are squared and positioned in slightly overlapping relation along the vertical plane defined by the electrode wheels 23. The cylinders 25 are then actuated in an extending direction, forcing the electrode wheels toward each other. The lower journal bracket is provided with slightly greater pivoting force, through proper arrangement of leverages, pressures, etc., so that the lower journal bracket will pivot upwardly until limited by the sleeve 31 engaging the adjustable hand wheel 33. The arrangement is such that the upper periphery of the lower electrode wheel is substantially coplanar with the lower surface of the lower strip section.

With pressure thus applied to the electrode wheels 23 the welder assembly is moved transversely with respect to the base 10 so that the wheels 23 are caused to traverse the overlapped workpieces. Welding current is supplied to the wheels 23 during this period so that the workpieces are heated and fused in a progressive manner. And as the workpieces soften to the point of fusion, the heavy pressure applied through the electrodes 23 by the actuators 25 flattens the overlapped seam so that while it may be of somewhat greater thickness than a single strip or sheet. It is substantially thinner than the two-thickness dimension of a normal lap weld.

To draw the welder assembly or carriage 16 through its traverse there is provided a drive motor 39 which operates through a clutch or transmission mechanism 40 to drive an elongated threaded shaft 41, the latter having driving engagement with the welder carriage by means of a threaded bearing 42.

Initially the carriage 16 may be positioned in the manner represented by the broken lines in Figure 3, with the electrode wheels 23 lying outside of the strip. As soon after the start of the carriage traverse as the electrode wheels 23 engage the strip it is desirable to initiate the flow of welding current. For this purpose I prefer to employ a travelling trip switch mechanism, generally indicated at 43 in Figure 1, which is constructed in accordance with the teachings of the Geiszler et al. U. S. Patent No. 2,634,353. In this trip switch mechanism there is provided a follower wheel which moves with the welding electrodes along the surface of the strip supporting platform, up onto the strip, and onto the platform again at the other side of the strip. This first wheel supports a carrier arm upon which is mounted a switch operating follower wheel. A groove is provided in the strip supporting platform in which the switch operating wheel normally is received. However, when the latter wheel encounters the strip, during the traverse of the welding electrodes, it is caused to move sharply upwardly, notwithstanding that the strip may be extremely thin, so that the flow of welding current is properly and accurately initiated under all circumstances. In connection with the trip switch mechanism just described I may employ a power control circuit of the type disclosed in the Riley et al. U. S. Patent No. 2,648,749.

Figure 4:
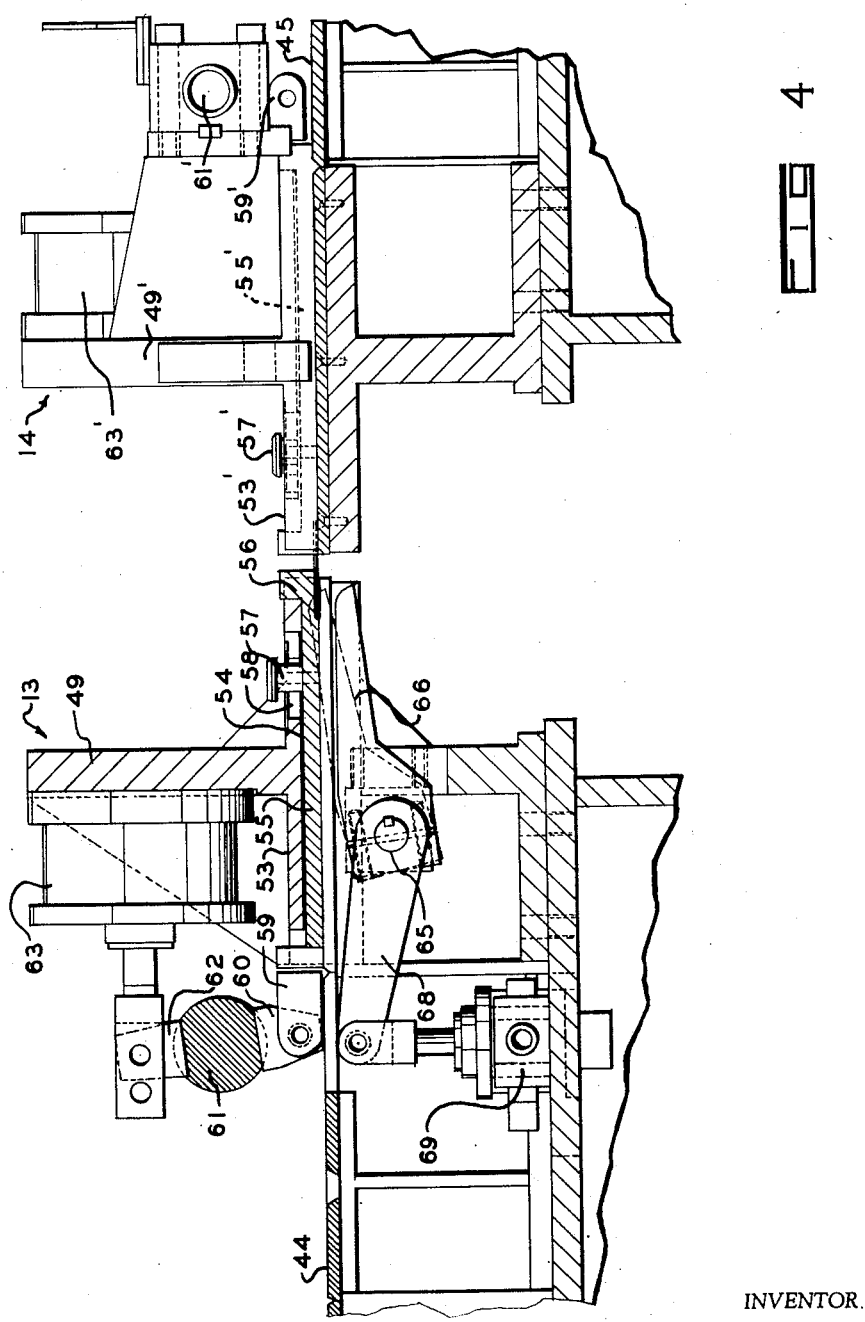
Figure 4 is an enlarged fragmentary section view, taken generally along line IV—IV of Figure 2, illustrating my novel strip positioning and clamping arrangement as incorporated in the apparatus of Figure 1.
Figure 5:
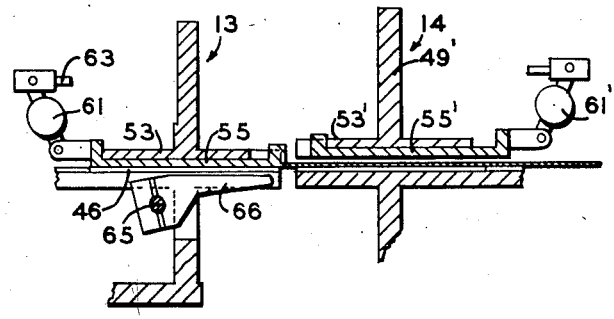
Figures 5–7 are enlarged fragmentary views of the strip positioning and clamping apparatus of Figure 4, illustrating the same in various operative positions.

In order to properly position and hold the strip end sections for welding I have provided a novel arrangement which is best illustrated in Figures 4–7, 9 and 10. Thus, as illustrated in Figure 4, the base 10 is provided on each side of the central recess therein with strip supporting platforms 44 and 45 at the entry and exit sides respectively of the base. The platforms 44 and 45 may be more or less continuous, but in accordance with the preferred objects of the invention the platforms are defined by a plurality of longitudinally extending spaced parallel supporting rails 46.

Above the supports 44 and 45, adjacent the recess 15 are entry and exit side clamping members 13 and 14 respectively which extend toward the central transverse axis of the machine, being spaced slightly apart from each other, as indicated in Figure 1. The entry side clamping assembly 13 comprises a heavy vertically disposed plate 49 which is connected at its ends, at opposite sides of the machine base 10, with large clamping cylinders 50 mounted in the lower portion of the base 10. As indicated in Figure 1, the cylinders 50 have long upwardly extending operating rods 51 which are guided in bearings 52 and which project upwardly through the top of the base for connection with the plate 49.

Rigidly mounted along the lower edge of the vertical plate 49 is a horizontal clamping plate 53 which overlies the supporting rails 46 at the entry side of the base, which rails constitute the lower clamping means, in cooperation with the plate 53. Intermediate the rails 46, in the plate 49, there are provided a plurality of downwardly opening recesses 54 in which are loosely received a plurality of longitudinally movable gage bar members 55. The gage bars 55 are provided along their front end portions with abutment portions 56 which are adapted to engage the trailing end edge of a length of strip or sheet in a manner to be further described.

To retain the gage bars 55 in the recesses 54 therefor I provide, in accordance with the teachings of the invention, large-headed pins 57 which extend upwardly from front portions of each of the gage bars, through longitudinal slots 58 provided therefor in the clamping plate 53. As shown in Figure 4, the pins 57 are of such length that when the gage bars 55 are fully received in the guiding recesses 54 the heads of the pins project above the clamping plate 53 a distance in the order of one half inch, for example. The arrangement is such that the front portion of the gage bar 55 may hang below the lower surface of the clamping plate 53 while being wholly received within the guiding recesses 54 therein while a strip length is held in the clamps.

At the outer end of the gage bars 55 there are provided yokes 59 which are pivotally engaged with lever members 60 carried upon a horizontal shaft 61. The shaft 61 is journaled at its opposite ends by the upper member of the entry side clamp assembly 13, so as to be movable therewith, and is drivingly connected through an upwardly extending lever member 62 with an actuating cylinder 63 mounted upon the vertical plate 49. The arrangement is such that upon actuation of the cylinder 63 the shaft 61 is rocked to simultaneously move all of the gage members 55 in extending or retracting directions with respect to the clamping plate 53.

As will be observed in Figures 4–7, the gage bars 55 project forwardly of the forward edge of the clamping plate 53 in a first or gaging position, while being recessed behind the forward edge of the plate 53 when in a retracted position.

In the exit side clamping assembly 14 there is provided a gage bar apparatus which is similar to that described above, elements of which are designated by primed reference numerals corresponding to the basic numerals designating parts of the entry side gage assembly 13. Attention is directed, however, to the fact that the gage bar retaining pin 57' of the exit side gage assembly need not project above the clamping plate 53' to the extent that the pin 57 does. The reason for this will become apparent as the description proceeds.

During the movement of strip material through the welder apparatus, in normal operation of the processing line, both of the clamping assemblies 13 and 14 will of course be in an upraised or open position to permit the free passage of strip therethrough. When a coil or length of material has been exhausted the trailing end thereof is sheared off square, by suitable means not shown, and the sheared end is drawn past the entry side clamping assembly 13. At this time the entry side clamping cylinders 50 are energized to draw the clamping plate 53 downwardly into clamping position. There being no strip in the entry side clamp at this time, the gage bars 55 hang downwardly to the extent permitted by the elongated pins 57 so as to be in obstructing relation to the exhausted strip section, to limit rearward movement thereof.

Cylinder 63, previous to this time, has been actuated so that the gage bars 55 are projected forwardly of the entry side clamping assembly, into desired gaging position.

At this time pinch rolls 64, located at the exit side of the welder, are reversely actuated so that the sheared trailing end of the exhausted strip length is backed up against the projected gage bars 55. The strip is thereby accurately positioned, substantially in the manner indicated in Figure 5, and the exit side clamping cylinders 50' are then actuated to draw the clamping plate 53' down onto the strip to firmly grip the same in the thus determined position.

As will be understood, the position of the thus clamped strip is such that the trailing end thereof projects slightly past the center line of the welding electrodes 23.

After the exhausted strip length has been properly clamped the entry side clamp assembly 13 is raised and the gage bars 55 thereof retracted, while the gage bars 55' of the exit side assembly 14 are advanced into gaging position. A new strip length is now moved into position, it being understood, of course, that the leading end of the new strip will have been previously squared, by shearing, for example.

Figure 6:
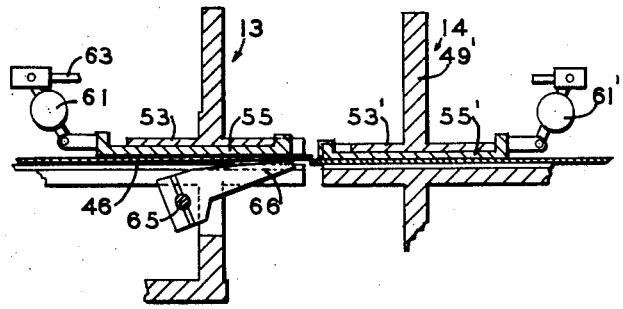

In order that the new strip length, upon its entry into the welding apparatus, may be moved into overlapped relation with the theretofore positioned and clamped strip, in the manner desired, I have provided a novel arrangement comprising a transversely disposed shaft 65 which is journaled in the machine base 10, below the lower entry side clamping plates 46. At spaced points along the shaft 65, preferably directly below the entry side gage bars 55, there are provided a plurality of forwardly extending lifters 66 which are keyed to the shaft 65 and adapted upon its counterclockwise rotation to project above the level of the lower entry side clamping plates 46 and above the level of the top surface of the theretofore clamped strip. The arrangement is shown in Figure 6.

Figure 7:
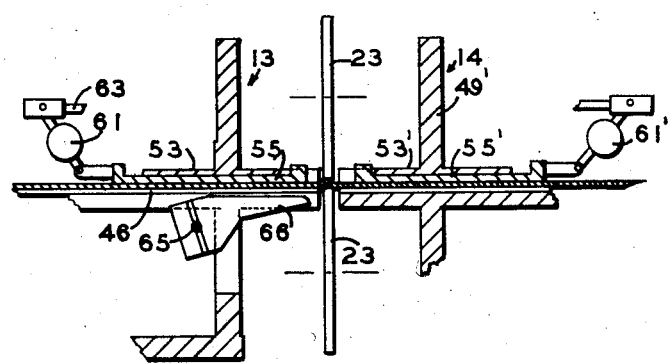

Thus, as the new strip is fed into the welder, by means of pinch rolls 67 located at the entry side of the machine, the leading end of the strip is deflected upwardly over the top of the first strip and into engagement with the projected clamping bars 55' of the exit side clamping assembly. The strips are now overlapped in the desired relation, and the entry side clamp is brought down by actuating the clamping cylinders 50. The strip is then ready for welding, as shown in Figure 7.

In order to actuate the strip deflecting members 66 a lever 68 is connected to the shaft 65 and to a small hydraulic cylinder 69, in the manner indicated in Figure 4. The cylinder 69 is actuated following the proper clamping of the exhausted strip and the raising of the entry side clamping assembly to provide for the entry of the new strip.

In view of the fact that optimum welding results may require slightly more overlapping of the workpieces in the case of thick strip than in the case of thin strip it is desirable to provide means for adjusting the movement of the gage bars. Of course, it will be understood that the overlapping of workpieces is very slight in the first place, and that adjustments of the gage will be of even less magnitude. Therefore, I have found that I may provide for the adjustment of only one of the two sets of gage bars. This will result in a slight off-center relationship between the overlapped seam and the electrode wheels 23, but such eccentricity is so slight as to be wholly immaterial.

Figure 2:
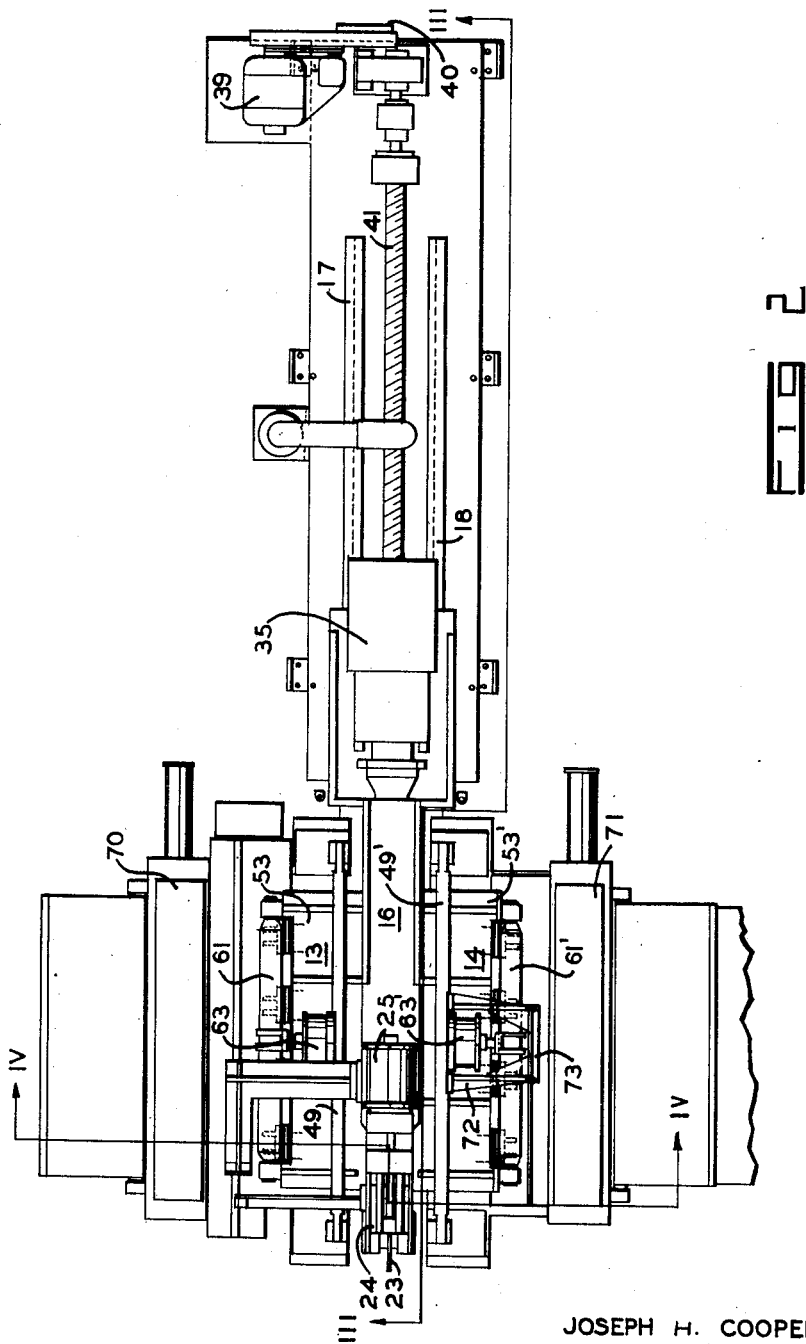
Figure 2 is a top plan view of the apparatus of Figure 1.

Referring now to Figures 2 and 9, it will be observed that about the exit side gage bar actuating cylinder 63' there is provided a generally U-shaped bracket, the legs 72 of which are attached to the vertical clamp supporting plate 49' and the transversely disposed front side 73 of which is positioned slightly outwardly of the yoke 74 which is attached to the operating rod of cylinder 63'. The arrangement is such that upon a predetermined outward movement of the yoke 74 the same comes into abutting contact with the outer member 73 of the U-shaped bracket, so that further movement of the clevis, and consequently of the exit side gage bars 55' is prevented.

To adjust or regulate the movement of the exit side gage bars 55' I provide for the insertion of shims or spacer plates 75 between the outer side of the bracket and the yoke 74 so that the extent of movement of the yoke may be variably limited.

In accordance with usual welding practice, the welder is provided at each side with strip centering mechanisms, generally indicated by the reference numerals 70 and 71. It will be understood, of course, that these mechanisms are brought into operation prior to the clamping of the respective strip ends so that the same are properly aligned, longitudinally, with respect to the welding machine and with respect to each other. The strip centering mechanisms may be of any suitable conventional design, and do not, in themselves, form any part of this invention.

It should thus be apparent that I have accomplished the several objects initially set forth. I have provided a novel and improved semi-mash type seam welder which is of a substantially more simplified and compact nature than apparatus heretofore proposed for performing the same general operation. The base 10 is highly compact in its longitudinal dimensions, so as not to add materially to the overall length of the processing line.

Many of the advantages of my apparatus are made possible by my novel strip positioning and clamping arrangement which incorporates fixed clamping assemblies with retractible gage means therein for properly arranging the strip in slightly overlapped relation. As will be readily apparent, it is of utmost importance to accurately overlap the workpieces so that the lapped joint may be flattened in the desired manner, while at the same time consistently satisfactory welding results are obtained. The use of fixed clamping assemblies assures that the strip ends, once properly positioned, will remain in the exact overlapping relationship desired, so that the welded seam is uniform in strength and appearance throughout its entire extent. In combination with this I provide gage means which are retractibly carried by the fixed clamping means so that the adjacent edges of strip lengths may be precisely positioned in the desired manner time after time.

One of the important, though perhaps indirect, advantages of my arrangement for positioning and clamping the strip ends for welding lies in the rapidity with which the entire operation may be performed. After the strip is fed into the clamps and properly positioned by the gage bars, it is ready for welding, and it is unnecessary, as in some prior art installations, to then transfer whole units of the machine to a welding station to complete the welding operation.

It should be understood, however, that the specific embodiment herein described is intended to be illustrative only as many changes may be made therein without departing from the clear teachings of the invention. Reference should therefore be made to the following appended claims in determining the full scope of the invention.

I claim:

1. In a strip welding apparatus of the type wherein adjacent ends of strip sections to be welded are positioned in slightly overlapping relation and thereafter traversed by opposed welding electrodes, the combination of a base, longitudinally spaced vertically operable entry side and exit side clamping devices mounted on said base, a welding head having opposed electrode wheels mounted in transversely movable relation to said base between said clamping devices, first retractible gage bar means adapted to rigidly limit rearward movement of the trailing end portion of a first strip section whereby the same may be accurately positioned and clamped by said exit side clamping device, and second retractible gage bar means adapted to rigidly limit forward movement of the leading end of a second strip section in slightly overlapping relation to said first strip section.

2. In a strip welding apparatus of the type wherein adjacent ends of strip sections to be welded are positioned in slightly overlapping relation and traversed by opposed welding electrodes, the combination of a base, longitudinally spaced vertically operable but otherwise fixed entry side and exit side clamping devices mounted on said base and retractible gage bar means carried by each of said clamping devices, the gage bar means carried by said entry side clamping device being adapted to rigidly limit rearward movement of the trailing end of a first strip section positioned within said exit side clamping device, the gage bar means carried by said exit side clamping device being adapted to rigidly limit forward movement of the leading end of a second strip section positioned within said entry side clamping device.

3. Apparatus according to claim 2 further characterized by said clamping devices comprising fixed lower clamping plates and vertically movable upper clamping plates, the upper clamping plate of said entry side clamping device having means therein to loosely receive entry side gage bar means, means operative upon upward or releasing movement of said upper clamping plate to provide for the downward movement of said entry side gage bar means whereby the latter is positioned in obstructing relation to strip moving rearwardly toward said entry side clamping device, and actuator means on said entry side clamping device to move said entry side gage bar means longitudinally between extended and retracted positions.

4. In a strip welding apparatus of the type having means to clamp opposed strip sections and abutment type gage means to assist in the proper positioning of said strip sections, the improvement comprising a fixed clamping plate, a vertically movable clamping plate, one of said plates having a longitudinal recess therein, a longitudinally movable gage bar received in said recess and movable therein between extended and retracted positions, and actuator means for selectively moving said gage bar means between said extended and retracted positions.

5. Apparatus according to claim 4 further characterized by said gage bar means being carried by the upper one of said clamping plates, and further including means to loosely retain said gage bar means in said recess whereby upon vertical separating movement of said clamping plates said gage bar moves vertically in said recess into obstructing relation to the strip pass line between said clamping plates.

6. Apparatus according to claim 4 further characterized by said gage bar means being vertically movable in said recess, said gage bar means being vertically movable into obstructing relation to the strip pass line between said clamping plates upon a vertical separation thereof.

7. In a semi-mash type strip welding device the combination with a transversely movable pair of opposed welding electrodes of a base having a transverse recess therein for the reception of said welding electrodes, strip clamping means on said base on opposite sides of said welding electrodes, first gage means on the entry side of said welding electrodes to limit rearward movement of the trailing end of a first strip section, second gage means on the exit side of said welding electrodes for limiting the forward movement of the leading edge of a second strip section, and means to support one of said strip sections in elevated relation to the other whereby the same may be positioned in slightly overlapping relation.

8. Apparatus according to claim 7 further characterized by said last mentioned means comprising a shaft journaled in said base, arm means extending outwardly of said shaft and adapted upon rotation of said shaft to deflect one of said strip sections, and means to rotate said shaft.

9. Apparatus according to claim 7 further characterized by said last mentioned means comprising means adapted to be selectively interposed in the pass line of one of said strip sections to deflect the same relative to the other strip section.

10. In a semi-mash type strip welding device the combination with a transversely movable pair of opposed welding electrodes of a base, strip clamping members mounted on said base on opposite sides of said welding electrodes, and separate retractible gage means carried by each of said clamping members and adapted to be moved into obstructing relation to strip moving through one clamp and toward the other.

11. Apparatus according to claim 10 further characterized by said gage means comprising a plurality of longitudinally disposed and longitudinally movable gage bar members, a shaft journaled in each of said clamping members and having driving connection with the gage bar members thereof, and means to rotate said shafts.

12. Apparatus according to claim 10 further including actuator means for each of said separate gage means, and means to regulate the actuating movement of at least one of said actuator means whereby to adjust the relative positions of said gage bars.

13. Apparatus according to claim 10 further characterized by the said gage means on at least one of said clamping members being movable vertically as well as longitudinally whereby such gage means may be positioned in strip obstructing relation when said one of said clamping means is in an open condition.

14. In a strip welding device the combination with a transversely movable pair of opposed welding electrodes of a housing having a transverse opening therein for the reception of said welding electrodes, strip clamping means on opposite sides of said welding electrodes, retractable first gage means on the entry side of said welding electrodes to gage the trailing end of a first strip section, retractable second gage means on the exit side of said welding electrodes for gaging the leading edge of a second strip section, and means to support at least one of said strip sections in elevated relation with respect to the other whereby the same may be positioned in overlapping relation.

15. Apparatus according to claim 14 further characterized in that said last mentioned means comprises means selectively operative to move one of said strip sections above the normal pass line of the strip sections.

16. Apparatus according to claim 14 further characterized in that said device further comprises actuating means for each of said gage means, and means to variably limit the movement of said actuating means.

17. In a strip welder the combination with a transversely movable pair of opposed welding electrodes of a housing, strip clamping members on opposite sides of said welding electrodes, separate retractable gage bar means carried by each of said clamping members and adapted to be moved in obstructing relation to strip moving through one clamp toward the other, actuator means for each of said separate gage bar means comprising a fluid cylinder having a piston, linkage means interconnecting said cylinders with the gage bar means associated therewith, a bracket encompassing at least one of said cylinders adapted to act as a limit stop for said piston and said linkage means of said cylinder, and spacer plates adapted to be interposed on said bracket whereby the movement of said cylinder and said linkage means may be variably limited.

References Cited in the file of this patent
UNITED STATES PATENTS

| | | |
|---|---|---|
| 2,369,830 | Johnson et al. | Feb. 20, 1945 |
| 2,412,648 | Rendel | Dec. 17, 1946 |